(12) United States Patent
Chen et al.

(10) Patent No.: US 6,644,904 B2
(45) Date of Patent: Nov. 11, 2003

(54) WOOD SCREW WITH SQUARE THREADS

(76) Inventors: Shu-Li Chen, P.O. Box No.6-57, Chung-Ho, Taipei 235 (TW); Shiu-Mei Chen, P.O. Box No.6-57, Chung-Ho, Taipei 235 (TW)

( * ) Notice: Subject to any disclaimer, the term of this patent is extended or adjusted under 35 U.S.C. 154(b) by 0 days.

(21) Appl. No.: 10/024,231

(22) Filed: Dec. 21, 2001

(65) Prior Publication Data

US 2003/0118423 A1 Jun. 26, 2003

(51) Int. Cl.[7] ................................................. F16B 25/00
(52) U.S. Cl. ..................................... 411/387.2; 411/386
(58) Field of Search .................... 411/386, 387.1–387.8, 411/311

(56) References Cited

U.S. PATENT DOCUMENTS

| | | | | |
|---|---|---|---|---|
| 1,084,643 A | * | 1/1914 | Lasater | |
| 2,263,137 A | * | 11/1941 | Oestereicher | |
| 4,028,987 A | * | 6/1977 | Wilson | |
| 4,834,602 A | * | 5/1989 | Takasaki | |
| 4,874,278 A | * | 10/1989 | Kawashita | |
| 5,273,383 A | * | 12/1993 | Hughes | |
| 5,827,030 A | * | 10/1998 | Dicke | |

* cited by examiner

Primary Examiner—Flemming Saether
(74) Attorney, Agent, or Firm—Troxell Law Office PLLC

(57) ABSTRACT

A wood screw to be used exclusively for fastening a wooden plate mainly has a screw shank helically disposed with squared threads, wherein a shaft flange is disposed at the bottom end of the screw shank to be parallel or slanted to the longitudinal axis of the screw shank between the upper and the bottom rims of the third and fourth threads. The shaft flange is in a convex trapezoid shape and is positioned vertically along the shank to make a pointed or planar cut so as to reduce friction for a smoother driving, an easier and labor-saving operation.

4 Claims, 4 Drawing Sheets

WOOD SCREW WITH SQUARE THREADS

BACKGROUND OF THE INVENTION

1) Field of the Invention

The present invention relates to a screw used exclusively for the wooden plate, more especially a screw structure that reduces turning friction for an easy and secured fastening.

2) Description of the Prior Art

The conventional structure of a wood screw usually comprises a shank with a screw head and threads disposed along the shank. Such wood screw generally has rounded side ridges with larger surfaces creating bigger contact friction and requires large turning torque to drive in to wooden plate completely. Manufacturers have developed screws with polygonal threads to reduce their contact surfaces and friction. Although such screws can improve the shortcomings of the round threads, the pointed tips thereof continue to cut through the object to be secured during screwing. Therefore, to reduce the fiction through only the polygonal threads is insufficient. It is necessary to provide a screw structure capable of increasing the efficiency, enhancing the practical value of the product and exclusive for fastening wooden plates. It is also the motive of the innovation of the present invention.

SUMMARY OF THE INVENTION

The primary objective of the present invention is to provide an improved screw structure to be used exclusively for fastening wooden plates and the bottom end thereof can make a pointed or planar cut at a certain degree so as to reduce the friction and to enable a more efficient and smoother fastening.

The aforesaid screw structure comprises a shank with a screw head at the top end and square edged threads arranged helically along the shank; wherein, between the third and the fourth threads from the bottom end of the screw, a shaft flange is positioned parallel or slanted to the longitudinal axis of the shank. When the screw is driven, the shaft flange makes a pointed or planar cut the object to be secured and thereby reduces friction.

The abovementioned screw structure positions the shaft flange between the upper and the lower rims of the third and the fourth threads.

The abovementioned screw structure has a shaft flange disposed at the bottom end of the shank in a convex trapezoid shape to facilitate a pointed or planar cut.

To enable a further understanding of the main features and innovation of the invention herein, the brief description of the drawings below is followed by the detailed description of the preferred embodiments.

DETAILED DESCRIPTION OF PREFERRED EMBODIMENTS

Figure 1:
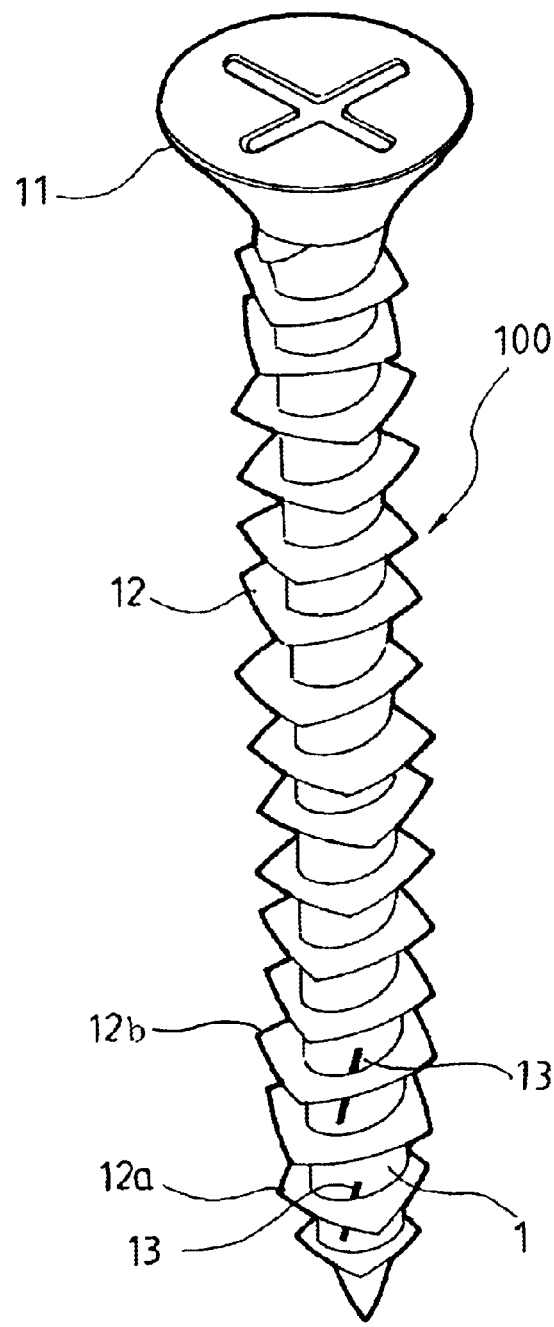
FIG. 1 is a pictorial and schematic drawing of the present invention.
Figure 2:
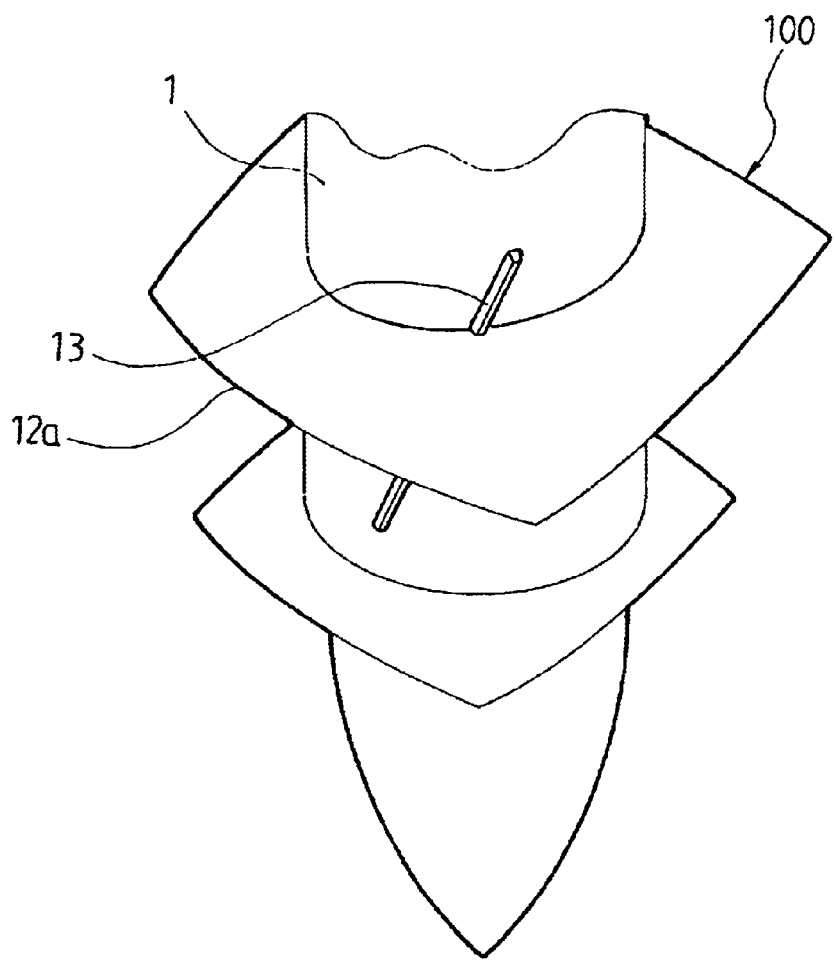
FIG. 2 is a pictorial and schematic drawing of a shaft flange of the present invention.

Referring to FIGS. 1 and 2, the pictorial and schematic drawings of the present invention and the shaft flange thereof, this invention comprises a screw shank (1) with a screw head (11) at the top end of the screw shank (1) and helical threads with square edged threads (12) on the screw shank (1). Wherein, at the bottom end of the said screw shank (1), a shaft flange (13) is positioned slightly slanted along the longitudinal axis of the shank between the upper and the lower rims of the second thread (12*a*) at the bottom end and the fourth thread (12*b*), such that when the screw (100) is driven, the shaft flange (13) makes a pointed or planar cut to the object to be fastened to reduce the friction so as to facilitate the driving with low resistance.

The abovementioned shaft flange (13) takes a convex trapezoid shape vertically to form an effect of a cutting knife to allow the screw (100) to be secured to the object with low torque and low friction.

Figure 3:
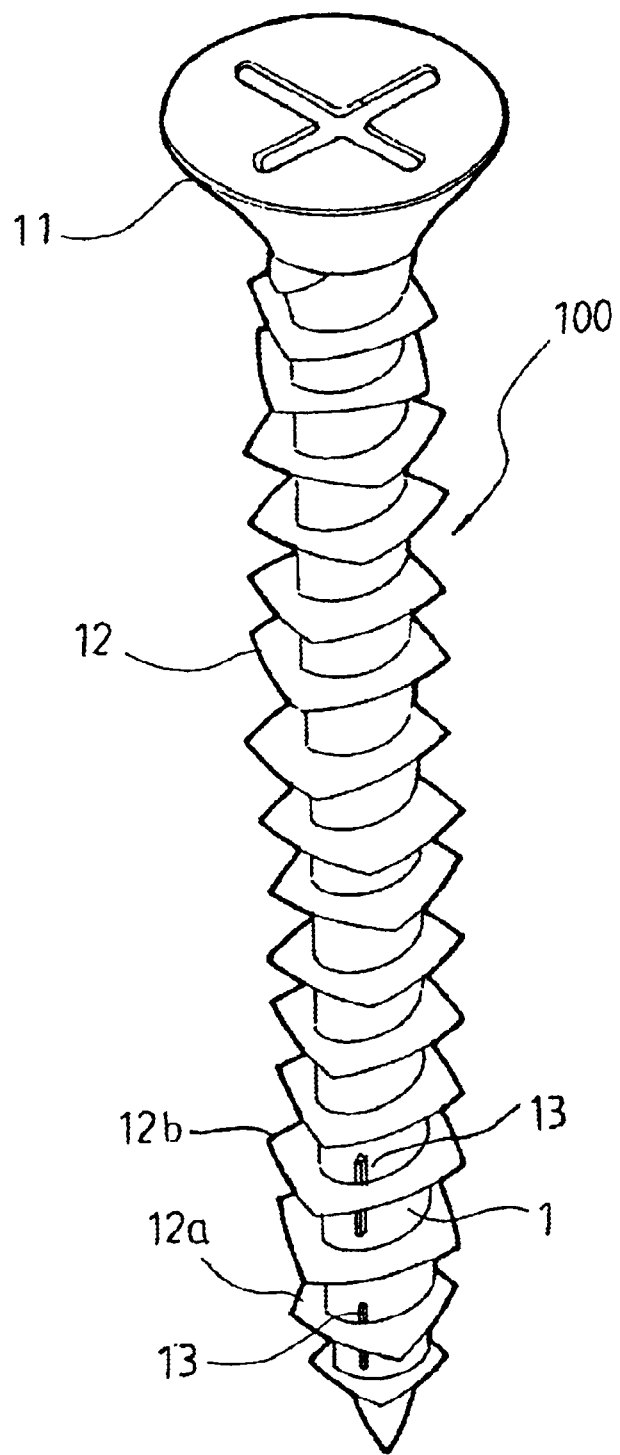
FIG. 3 is a pictorial and schematic drawing of another exemplary embodiment of the present invention.
Figure 4:
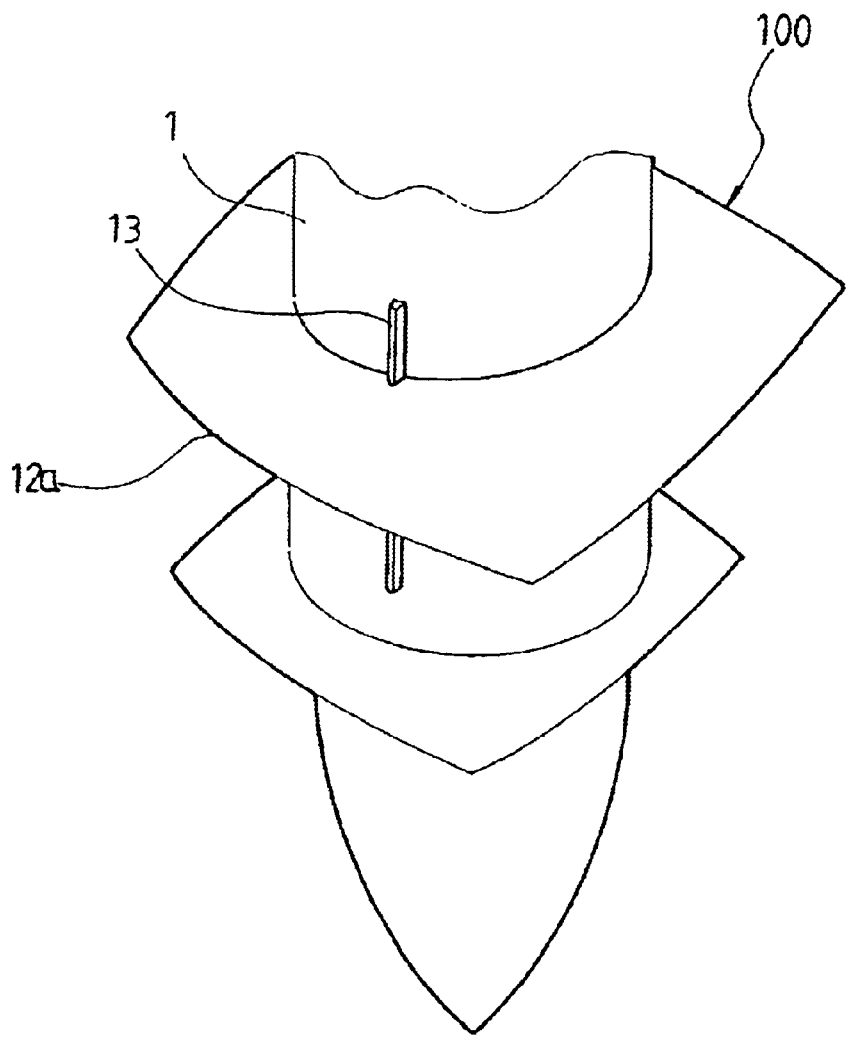
FIG. 4 is a pictorial and schematic drawing of another exemplary embodiment of the shaft flange of the present invention.

Referring to FIGS. 3 and 4, the pictorial and schematic drawings of another exemplary embodiment of the present invention and a pictorial and schematic drawing of another exemplary embodiment of the shaft flange of the present invention, the present invention has a shaft flange (13) disposed parallel to the longitudinal axis of the screw shank (1) between the upper and the lower rims of the second thread (12*a*) and the fourth thread, such that when the screw (100) is driven, the shaft flange (13) forms a planar cut.

In summation of the foregoing sections, the design of disposing a shaft flange at the bottom end of the screw shank, between the third and fourth threads perpendicularly or slightly slanted, to reduce the turning friction when the screw is driven and to allow a more efficient and secured fastening, is of a practical innovation. It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. A wood screw comprising:
   a) a screw shank having a screw head at a first end, helical threads with square edged threads extending along a main body of the shank, and a second end; and,
   b) two pairs of shaft flanges, a first pair of shaft flanges extending on the main body of the shank above and below a second thread from the second end of the screw shank, a second pair of shaft flanges extending on the main body of the shank above and below a fourth thread from the second end of the screw shank, each shaft flange having a length less than a distance between adjacent threads.

2. The wood screw with square threads according to claim 1, wherein the shaft flanges are oriented parallel to a longitudinal axis of the screw shank.

3. The wood screw with square threads according to claim 1, wherein the shaft flanges are oriented obliquely to a longitudinal axis of the screw shank.

4. The wood screw with square threads according to claim 1, wherein the shaft flanges each have a trapezoid cross-sectional configuration.

* * * * *